(12) United States Patent
Isobe et al.

(10) Patent No.: US 9,313,815 B2
(45) Date of Patent: Apr. 12, 2016

(54) RADIO COMMUNICATION TERMINAL AND COMMUNICATION METHOD

(71) Applicant: NTT DOCOMO, INC., Tokyo (JP)

(72) Inventors: Shin-ichi Isobe, Tokyo (JP); Katsutoshi Nishida, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/395,071

(22) PCT Filed: Apr. 18, 2013

(86) PCT No.: PCT/JP2013/061512
§ 371 (c)(1),
(2) Date: Oct. 17, 2014

(87) PCT Pub. No.: WO2013/161672
PCT Pub. Date: Oct. 31, 2013

(65) Prior Publication Data
US 2015/0105088 A1    Apr. 16, 2015

(30) Foreign Application Priority Data

Apr. 25, 2012 (JP) ................ 2012-100281

(51) Int. Cl.
*H04W 72/00* (2009.01)
*H04W 76/02* (2009.01)
*H04M 1/725* (2006.01)
*H04W 8/00* (2009.01)
*H04M 1/2745* (2006.01)

(52) U.S. Cl.
CPC .......... *H04W 76/023* (2013.01); *H04M 1/7253* (2013.01); *H04W 8/005* (2013.01); *H04M 1/274508* (2013.01)

(58) Field of Classification Search
None
See application file for complete search history.

(56) References Cited

FOREIGN PATENT DOCUMENTS

JP    2005-223722 A    8/2005
JP    2006-211471 A    8/2006

OTHER PUBLICATIONS

International Search Report for corresponding International Application No. PCT/JP2013/061512, mailed Jul. 2, 2013 (1 page).
Written Opinion for corresponding International Application No. PCT/JP2013/061512, mailed Jul. 2, 2013 (3 pages).
B. Bertenyi; "Key drivers for LTE success: Services Evolution;" 3GPP Seminar, LTE Asia; Sep. 6, 2011 (15 pages).
T. Sakamoto, et al.; "For Web developers Create Android applications with HTML5 + JavaScript;" Software Information Center, C&R Research Institute; May 24, 2005 (55 pages).

*Primary Examiner* — Adolf Dsouza
(74) *Attorney, Agent, or Firm* — Osha Liang LLP (57) ABSTRACT

Provided are a radio communication terminal capable of causing a communication application to speedily find out whether D2D communication is possible by using a radio access network such as LTE. A terminal 400A includes a terminal finding unit 405 configured to find a candidate terminal capable of executing direct communication with the terminal 400A, a phonebook processing unit 420 configured to obtain direct-communication phonebook data containing an identifier of the candidate terminal found by the terminal finding unit 405, based on regular phonebook data containing an identifier of another radio communication terminal and being associated with the terminal 400A, and a direct communication execution unit 430 configured to execute direct communication with a counterpart terminal (e.g., a terminal 400B) indicated in a communication request from a communication application 410A, 410C, when the counterpart terminal is contained in the direct-communication phonebook data as the candidate terminal.

4 Claims, 5 Drawing Sheets

PHONEBOOK OF USERS CAPABLE OF DIRECT COMMUNICATION (a)

| USER NAME | TELEPHONE NUMBER |
|---|---|
| A | 090-1234-5678 |
| B | 090-2345-6789 |
| C | 080-1111-2222 |
| D | 080-3333-4444 |
| ⋮ | |

TELEPHONE NUMBER (b)

| USER NAME | TELEPHONE NUMBER | DIRECT CALL |
|---|---|---|
| A | 090-1234-5678 | AVAILABLE |
| B | 090-2345-6789 | NOT AVAILABLE |
| C | 080-1111-2222 | NOT AVAILABLE |
| D | 080-3333-4444 | AVAILABLE |
| ⋮ | | |

FIG. 6

RADIO COMMUNICATION TERMINAL AND COMMUNICATION METHOD

TECHNICAL FIELD

The present invention relates to a radio communication terminal having a communication application installed therein and being capable of executing direct communication with another radio communication terminal without involving a radio access network, and also to a communication method.

BACKGROUND ART

Conventionally, Bluetooth (registered trademark) and ad-hoc mode of a wireless LAN are known as so-called Device-to-Device (D2D) communication that is a radio communication method in which multiple radio communication terminals (sometimes referred to simply as terminals hereinbelow) perform radio communication with each other directly without involving a radio base station or an access point. Such a radio method achieves short-range radio communication by using relatively-low radio transmission power. For this reason, it is difficult to use this radio communication method when the inter-terminal distance is long. In addition, in such a radio communication method, the radio transmission capacity is limited compared to a radio access network (e.g., UTRA (3G), E-UTRA (LTE), or GERAN (2G)) managed by a telecommunications carrier.

Against this background, it is being discussed to achieve the D2D communication by using a radio access network provided by a telecommunications carrier (e.g., Non-patent document 1).

In the case of using a radio access technology employed in such a radio access network, the terminals uses a frequency band which the telecommunications carrier is licensed to use by supervisory authorities, and therefore are enabled to output higher radio transmission power and achieve long-distance, large-capacity D2D communication without using resources on the network side such as a radio base station. Such a characteristic is considered particularly effective when the network side such as the radio base station is devastated by an earthquake or the like. In addition, when the D2D communication is achieved using the frequency band used in a radio access network managed by a telecommunications carrier, the terminals can perform the D2D communication without being equipped with a module for another type of radio communication (e.g., Bluetooth (registered trademark)), which offers advantages such as cost and size reductions for the terminals.

PRIOR ART DOCUMENT

Non-Patent Document

Non-patent document 1: "Key drivers for LTE success: Services Evolution," September 2011, 3GPP

SUMMARY OF THE INVENTION

However, performing D2D communication by using the radio access network described above has the following problem. Specifically, when a communication application installed in the terminal wants to execute D2D communication, the communication application cannot find out if D2D communication can be executed with a communication counterpart terminal or not. For this reason, the terminal cannot effectively initiate D2D communication.

Thus, the present invention has been made in view of such circumstances and has an objective of providing a radio communication terminal and a communication method capable of causing a communication application to speedily find out whether device-to-device direct communication (D2D communication) is possible or not in a case where the D2D communication is to be performed by using a radio access network such as LTE.

A first feature of the present invention is summarized as a billing system including: a radio communication terminal having a communication application installed therein and being capable of executing direct communication with another radio communication terminal without involving a radio access network, the radio communication terminal including: a terminal finding unit configured to find a candidate terminal capable of executing direct communication with the radio communication terminal; a phonebook processing unit configured to obtain second phonebook data containing an identifier of the candidate terminal found by the terminal finding unit, based on first phonebook data containing an identifier of the other radio communication terminal and being associated with the radio communication terminal; and a direct communication execution unit configured to execute direct communication with a counterpart terminal indicated in a communication request from the communication application, when the counterpart terminal is contained in the second phonebook data as the candidate terminal.

A second feature of the present invention is summarized as a billing system including: a communication method performed by a radio communication terminal having a communication application installed therein and being capable of executing direct communication with another radio communication terminal without involving a radio access network, the method including the steps of: finding a candidate terminal capable of executing direct communication with the radio communication terminal; obtaining second phonebook data containing an identifier of the candidate terminal found by the finding step, based on first phonebook data containing an identifier of the other radio communication terminal and being associated with the radio communication terminal; and executing direct communication with a counterpart terminal indicated in a communication request from the communication application, when the counterpart terminal is contained in the second phonebook data as the candidate terminal.

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of the Radio Communication System

Figure 1:
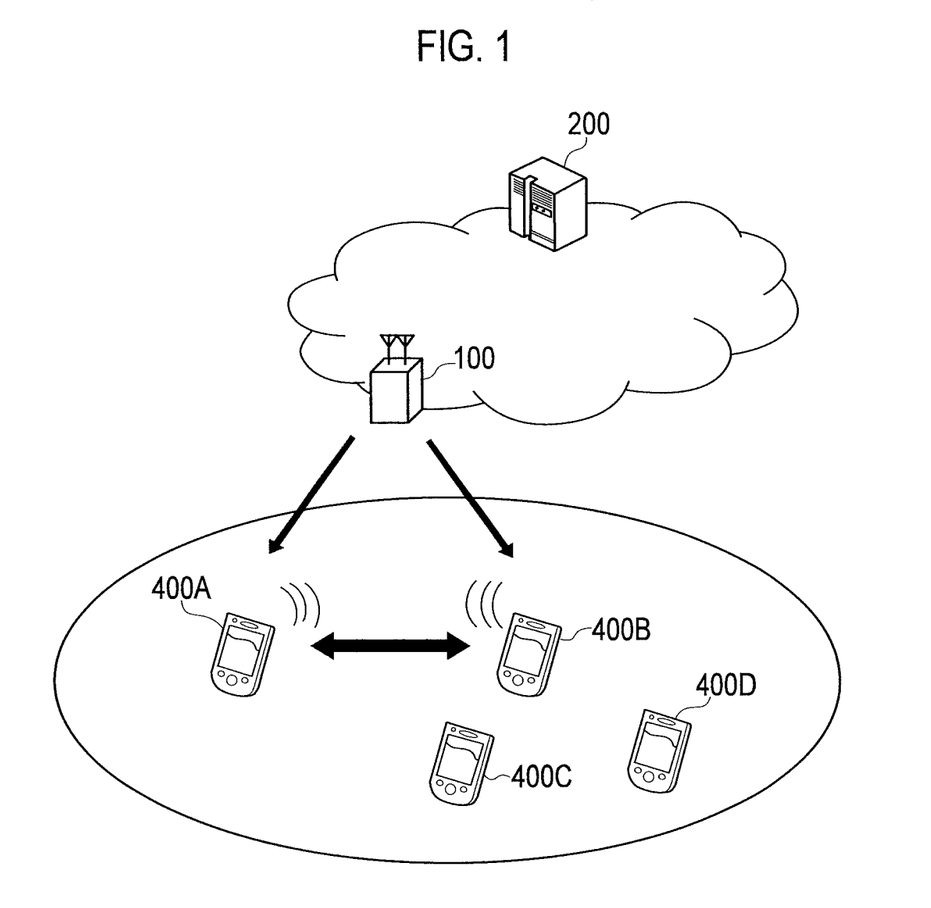
FIG. 1 is an overall schematic configuration diagram of a radio communication system 10 according to an embodiment of the present invention.

FIG. 1 is an overall schematic configuration diagram of a radio communication system 10 according to this embodiment. As shown in FIG. 1, the radio communication system 10 includes a radio base station 100, a phonebook server 200, and radio communication terminals 400A to 400D (terminals 400A to 400D hereinbelow).

The radio base station 100 performs operation conforming to a radio access technology (RAT) standardized by 3GPP, e.g., Long Term Evolution (LTE). In this embodiment, the radio base station 100 controls direct communication among the terminals 400A to 400D. More specifically, the radio base station 100 controls the direct communication by causing the radio base station 100 to transmit broadcast information indicating whether or not to permit communication among the terminals 400A to 400D without involving the radio base station 100, i.e., without involving a radio access network. Note that the broadcast information for controlling direct communication among the terminals 400A to 400D may be broadcasted separately from multiple radio base stations, e.g., the radio base station 100 and another radio base station (not shown).

In this way, in the radio communication system 10, direct communication among the terminals 400A to 400D is permitted based on the broadcast information from the radio access network side. In addition, when it is based on broadcast information from another radio base station (not shown), for example, direct communication may be permitted based on the broadcast information from the other radio base station even in an area not covered by the radio base station 100.

The phonebook server 200 manages phonebook data associated with the terminal 400A (to 400D, the same applies below). Specifically, the phonebook server 200 acquires phonebook data from the terminal 400A, and then performs tasks such as retaining and updating the phonebook data and responding to a telephone number inquiry.

The terminals 400A to 400D are each a User Equipment (UE) having a communication application installed therein and being configured to execute radio communication conforming to a radio access technology such as LTE. The terminal 400A (to 400D) can perform communication with another terminal via the radio base station 100, and can perform direct communication with another terminal without involving the radio base station 100.

Specifically, the terminal 400A (to 400D) determines whether direct communication is executable or not based on the broadcast information broadcasted from the radio base station 100, and executes direct communication at a predetermined timing or any timing. Note that, for this determination, information notified of by a communication control apparatus (not shown) which controls the radio base station 100 and terminals 400A to 400D (e.g., a direct-communication permission notification) may be added as an element of determination.

(2) Functional Block Configuration of the Radio Communication System

Figure 2:
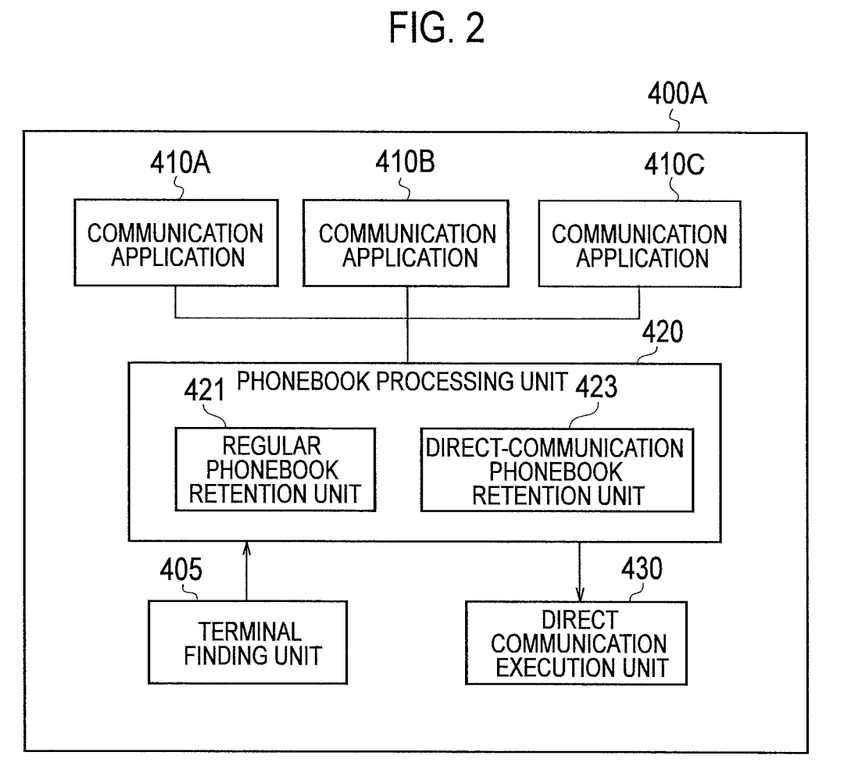
FIG. 2 is a functional block configuration diagram of a terminal 400A according to the embodiment of the present invention.

Next, a functional block configuration of the radio communication system 10 is described. Specifically, a functional block configuration of the terminal 400A (to 400D) is described. FIG. 2 is a functional block configuration diagram of the terminal 400A.

As shown in FIG. 2, the terminal 400A includes a terminal finding unit 405, communication applications 410A to 410C, a phonebook processing unit 420, and a direct communication execution unit 430. Note that the terminals 400B to 400D have similar functional block configurations to that of the terminal 400A.

The terminal finding unit 405 finds a candidate terminal (e.g., the terminal 400B) capable of executing direct communication with the terminal 400A. Specifically, the terminal finding unit 405 finds a terminal capable of executing direct communication with the terminal 400A, based on the radio field intensities of radio signals sent from the terminals 400B to 400D or on a reachable range of radio signals sent by the terminal 400A. The terminal finding unit 405 uniquely identifies the terminals 400B to 400D based on their identifiers such as telephone numbers or URIs (such as email addresses or SIP URIs), and extracts a terminal capable of executing direct communication with the terminal 400A.

The communication applications 410A to 410C are each a communication application installed in the terminal 400A. Specifically, the communication application 410A is an application operated only through direct communication, and is for example an application for delivering advertisement through direct communication.

The communication application 410B is a communication application provided via the radio access network, and is for example an application for web browsing or video playback.

The communication application 410C is an application which can be provided either through direct communication or via the radio access network, and includes an application for, for example, making voice calls, sending instant messages (IM), or the like. The communication application 410C therefore supports both direct communication and regular communication performed via the radio access network.

The phonebook processing unit 420 executes processing regarding phonebook data associated with the terminal 400A. Specifically, the phonebook processing unit 420 has a regular phonebook retention unit 421 and a direct-communication phonebook retention unit 423. The regular phonebook retention unit 421 retains regular phonebook data, and the direct-communication phonebook retention unit 423 retains direct-communication phonebook data. In this embodiment, the regular phonebook data contains identifiers of other terminals, or specifically the terminals 400B to 400D, and configures first phonebook data associated with the terminal 400A. The "first phonebook data associated with the terminal 400A" is phonebook data which can be used as phonebook data for the terminal 400A, and may be generated inside or outside of the terminal 400A. The direct-communication phonebook data configures second phonebook data containing an identifier of a candidate terminal (e.g., the terminal 400B) found by the terminal finding unit 405.

Based on the regular phonebook data, the phonebook processing unit 420 obtains the direct-communication phonebook data containing the identifier of the candidate terminal. Specifically, when the regular phonebook data contains the identifier of the candidate terminal, the phonebook processing unit 420 adds this identifier of the candidate terminal to the direct-communication phonebook data. Such processing by the phonebook processing unit 420 generates the direct-communication phonebook data constituted by the identifiers of candidate terminals capable of direct communication. In other words, the phonebook processing unit 420 generates the direct-communication phonebook data by acquiring a candidate terminal found by the terminal finding unit 405 and using the identifier of the candidate terminal contained in the regular phonebook data. Note that the phonebook processing unit 420 may, instead of storing the direct-communication phonebook data described above as a database, temporarily load phonebook data into memory and select the identifier of the candidate terminal from the loaded data.

Moreover, in response to a communication request from the communication application 410C which can be provided either through direct communication or via the radio access network, the phonebook processing unit 420 can provide the regular phonebook data and the direct-communication phonebook data, to the communication application 410C.

The direct communication execution unit 430 executes direct communication with another terminal (e.g., the terminal 400B) which is located within a predetermined distance from the terminal 400A and is therefore capable of executing direct communication with the terminal 400A. Specifically, the direct communication execution unit 430 executes the direct communication with the counterpart terminal when the counterpart terminal (the terminal 400B) indicated in the communication request from the communication application 410A or the communication application 410C is contained in the direct-communication phonebook data as a candidate terminal.

The direct communication execution unit 430 can receive permission information on direct communication via the radio access network. Upon receipt of the permission information, the direct communication execution unit 430 executes direct communication with a candidate terminal indicated in the communication request from the communication application 410A or the communication application 410C.

(3) Operation of the Radio Communication System

Next, operation of the above-described radio communication system 10 is described. Specifically, a description is given of operation of the terminal 400A generating direct-communication phonebook data (second phonebook data) and executing direct communication by using the direct-communication phonebook data.

(3.1) Generation of the Direct-Communication Phonebook Data

Figure 3:
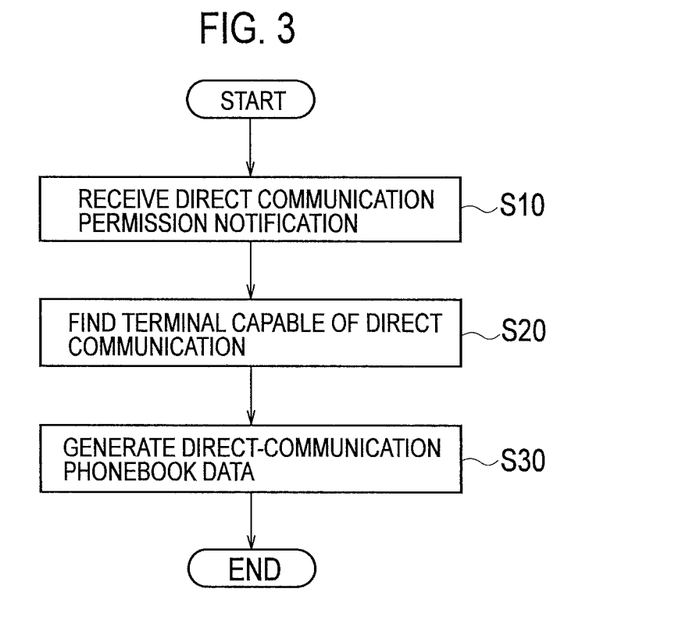
FIG. 3 is a diagram showing a flow of the terminal 400A generating direct-communication phonebook data according to the embodiment of the present invention.

FIG. 3 shows a flow of the terminal 400A generating direct-communication phonebook data. As shown in FIG. 3, the terminal 400A receives a direct communication permission notification from the network side via the radio base station 100 (S10). Note that the operation in S10 is not essential, and the terminal 400A may start the next operation in S20 without receiving the direct communication permission notification.

The terminal 400A finds a terminal capable of direct communication (S20). Specifically, the terminal 400A sends radio signals to other terminals located around the terminal 400A and detects whether they respond to the radio signals or not. The terminal 400A detects the response and thereby extracts a terminal capable of direct communication.

The terminal 400A acquires the identifier of a terminal the response from which was detected (a candidate terminal), and generates direct-communication phonebook data by using regular phonebook data which the terminal 400A retains (S30). Specifically, as described earlier, when the regular phonebook data contains the identifier of the candidate terminal, the terminal 400A adds the identifier of the candidate terminal to the direct-communication phonebook data.

Figure 5:
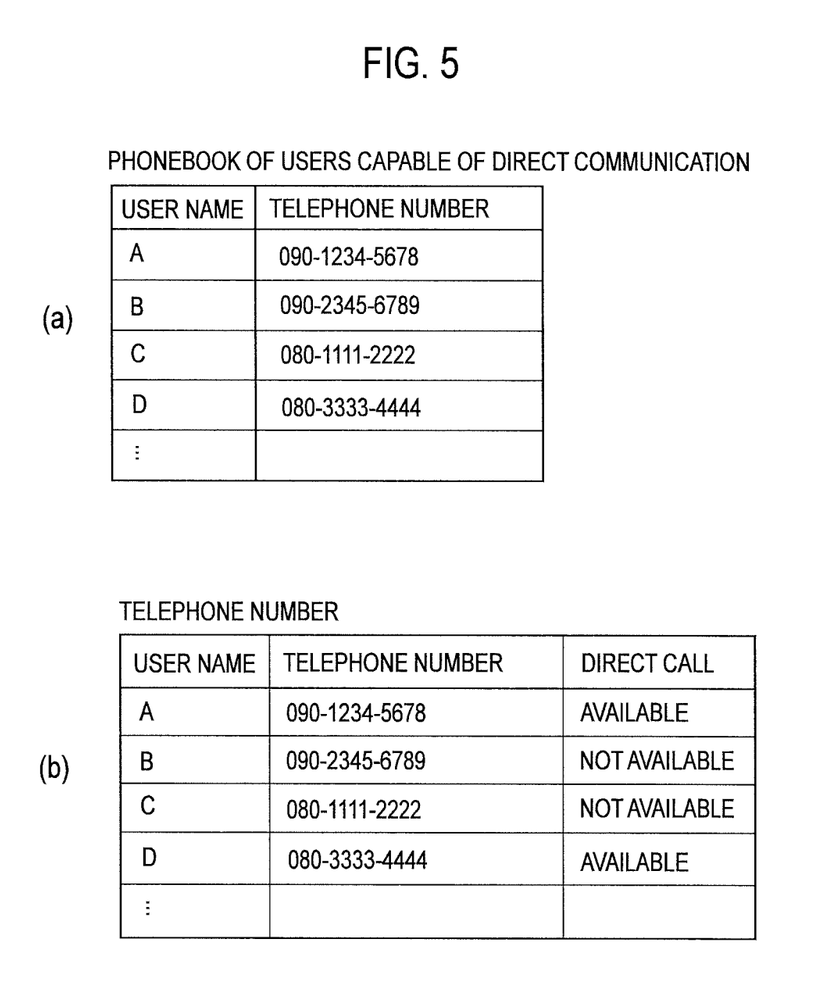
FIG. 5 is a diagram showing configuration examples of the direct-communication phonebook data according to the embodiment of the present invention.

FIGS. 5(a) and 5(b) show configuration examples of direct-communication phonebook data. The direct-communication phonebook data may be, as shown in FIG. 5(a), a phonebook of users capable of direct communication, the phonebook being created by use of the direct-communication phonebook data and constituted by terminals (users) capable of direct communication and the identifiers (telephone numbers) of the terminals, or may be, as shown in FIG. 5(b), a regular phonebook with each terminal having additional information indicating whether direct communication is possible or not (AVAILABLE OR NOT AVAILABLE) by use of the direct-communication phonebook data. Information constituting the direct-communication phonebook data is not limited to the above, but an email address and the like may be a component of the data.

Further, a phonebook like the one in FIG. 5(a) or 5(b) may display a communication application, such as one for making voice calls or sending IMs, which can be provided through direct communication, so that when a user commands activation of the application, direct communication with a counterpart terminal is executed.

(3.2) Execution of Direct Communication

Figure 4:
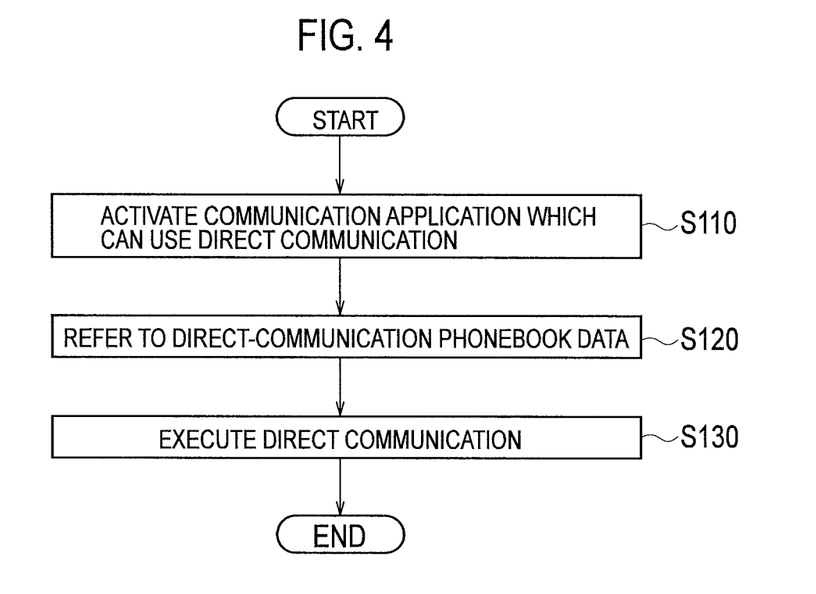
FIG. 4 is a diagram showing a flow of the terminal 400A executing direct communication according to the embodiment of the present invention.

FIG. 4 shows a flow of the terminal 400A executing direct communication. As shown in FIG. 4, the terminal 400A activates a communication application which can use direct communication (the communication application 410A and the communication application 410C) (S110).

The communication application activated in the terminal 400A refers to the direct-communication phonebook data (S120).

This communication application can access the direct-communication phonebook data via an application programming interface (API) for the phonebook. In order for the communication application which uses direct communication to use the API, the communication application notifies that the communication application uses direct communication, when using the API. Upon receipt of this notification, the phonebook processing unit 420 provides the direct-communication phonebook data to the communication application. Thereby, the communication application determines whether direct communication with a counterpart terminal is possible or not.

In response to a request from the communication application, the terminal 400A executes direct communication with the counterpart terminal (S130).

(4) Advantageous Effects

The terminal 400A (to 400D, the same applies below) obtains, based on regular phonebook data, direct-communication phonebook data containing an identifier of a candidate terminal capable of direct communication. Specifically, the terminal 400A acquires a candidate terminal found by the terminal finding unit 405, and generates direct-communication phonebook data by using regular phonebook data. Thus, the communication application 410A and the communication application 410C can find out speedily whether device-to-device direct communication (D2D communication) is possible or not in a case where the D2D communication is to be executed by using a radio access network such as LTE.

In other words, the user of the terminal 400A can find a radio communication terminal capable of D2D communication speedily and easily.

(5) Other Embodiment

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

Figure 6:
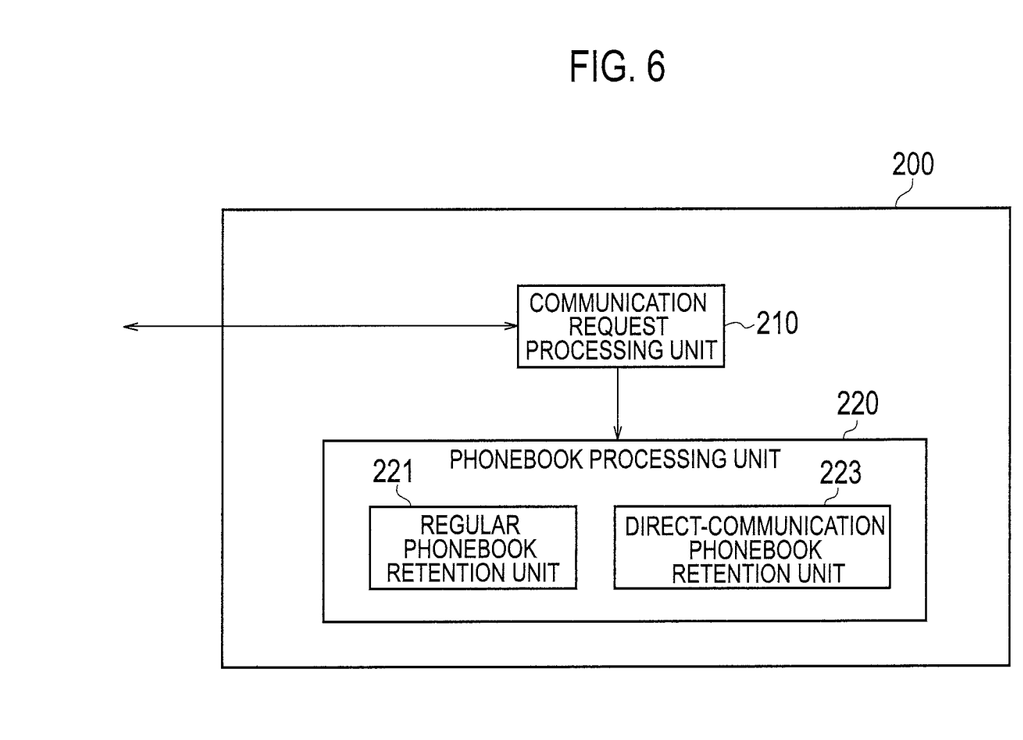
FIG. 6 is a functional block configuration diagram of a phonebook server 200 according to a modification of the present invention.

For example, in the example described in the above embodiment of the present invention, the terminal 400A (to 400D) retains phonebook data (regular phonebook data and direct-communication phonebook data). Instead, the phonebook data may be retained by the phonebook server 200. FIG. 6 is a functional block configuration diagram of the phonebook server 200 according to a modification of the present invention.

As shown in FIG. 6, the phonebook server 200 includes a communication request processing unit 210 and a phonebook processing unit 220. The phonebook processing unit 220 includes a regular phonebook retention unit 221 and a direct-communication phonebook retention unit 223. The regular phonebook retention unit 221 and the direct-communication phonebook retention unit 223 have similar functions to those of the regular phonebook retention unit 421 and the direct-communication phonebook retention unit 423 of the terminal 400A, respectively.

The communication request processing unit 210 processes a communication request sent from the terminal 400A (to 400D). Notified of the communication request by the communication request processing unit 210, the phonebook processing unit 220 refers to the regular phonebook retention unit 221 or the direct-communication phonebook retention unit 223, and responds to the communication request processing unit 210 with the identifier (such as a telephone number) of a counterpart terminal contained in the communication request and a result indicating whether direct communication is possible or not. The communication request processing unit 210 then notifies the terminal 400A (to 400D) of the identifier of the counterpart terminal and the result of whether direct communication is possible or not, which are contained in the response from the phonebook processing unit 220.

As described above, the present invention naturally includes various embodiments which are not described herein. Accordingly, the technical scope of the present invention should be determined only by the matters to define the invention in the scope of claims regarded as appropriate based on the description.

The features of the present invention may also be expressed as follows. A first feature of the present invention is summarized as radio communication terminals 400A to 400D (a radio communication terminal) having a communication application installed therein and being capable of executing direct communication with another radio communication terminal without involving a radio access network, the radio communication terminal including: a terminal finding unit configured to find a candidate terminal (for example, terminal 400B) capable of executing direct communication with the radio communication terminal; a phonebook processing unit 420 configured to obtain direct-communication phonebook data (second phonebook data) containing an identifier of the candidate terminal found by the terminal finding unit, based on phonebook data (first phonebook data) containing an identifier of the other radio communication terminal and being associated with the radio communication terminal; and a direct communication execution unit 430 configured to execute direct communication with a counterpart terminal indicated in a communication request from the communication application, when the counterpart terminal (for example, terminal 400B) is contained in the second phonebook data as the candidate terminal.

In the first feature of the present invention, the phonebook processing unit may acquire the candidate terminal found by the terminal finding unit, and may generate the second phonebook data by using the identifier of the candidate terminal contained in the first phonebook data.

In the first feature of the present invention, the communication application may support the direct communication and regular communication which is executed via the radio access network, and in response to the communication request from the communication application, the phonebook processing unit may provide the first phonebook data and the second phonebook data to the communication application.

In the first feature of the present invention, the direct communication execution unit may receives permission information on the direct communication via the radio access network, and may execute the direct communication with the counterpart terminal upon receipt of the permission information.

A second feature of the present invention is summarized as a communication method performed by a radio communication terminal having a communication application installed therein and being capable of executing direct communication with another radio communication terminal without involving a radio access network, the method including the steps of: finding a candidate terminal capable of executing direct communication with the radio communication terminal; obtaining second phonebook data containing an identifier of the candidate terminal found by the finding step, based on first phonebook data containing an identifier of the other radio communication terminal and being associated with the radio communication terminal; and executing direct communication with a counterpart terminal indicated in a communication request from the communication application, when the counterpart terminal is contained in the second phonebook data as the candidate terminal.

Note that the entire content of Japanese Patent Application No. 2012-100281 (filed on Apr. 25, 2012) is incorporated by reference in the present specification.

INDUSTRIAL APPLICABILITY

According to aspects of the present invention, what can be provided are a radio communication terminal and a communication method capable of causing a communication application to speedily find out whether device-to-device direct communication (D2D communication) is possible or not in a case where the D2D communication is to be executed by using a radio access network such as LTE.

EXPLANATION OF THE REFERENCE NUMERALS 10 radio communication system
100 radio base station 200 phonebook server
210 communication request processing unit
220 phonebook processing unit
221 regular phonebook retention unit
223 direct-communication phonebook retention unit
400A to 400D terminal
405 terminal finding unit
410A to 410C communication application
420 phonebook processing unit
421 regular phonebook retention unit
423 direct-communication phonebook retention unit
430 direct communication execution unit

The invention claimed is:

1. A radio communication terminal having a communication application installed therein and being capable of executing direct communication with another radio communication terminal without involving a radio access network, the radio communication terminal comprising:
 a terminal finding unit configured to find a candidate terminal capable of executing direct communication with the radio communication terminal;
 a phonebook processing unit configured to obtain second phonebook data containing an identifier of the candidate terminal found by the terminal finding unit, based on first phonebook data containing an identifier of the other radio communication terminal and being associated with the radio communication terminal; and
 a direct communication execution unit configured to execute direct communication with a counterpart terminal indicated in a communication request from the communication application, when the counterpart terminal is contained in the second phonebook data as the candidate terminal, wherein
 the direct communication execution unit receives permission information on the direct communication via the radio access network, and executes the direct communication with the counterpart terminal upon receipt of the permission information.

2. The radio communication terminal according to claim 1, wherein the phonebook processing unit acquires the candidate terminal found by the terminal finding unit, and generates the second phonebook data by using the identifier of the candidate terminal contained in the first phonebook data.

3. The radio communication terminal according to claim 1, wherein
 the communication application supports the direct communication and regular communication which is executed via the radio access network, and
 in response to the communication request from the communication application, the phonebook processing unit provides the first phonebook data and the second phonebook data to the communication application.

4. A communication method performed by a radio communication terminal having a communication application installed therein and being capable of executing direct communication with another radio communication terminal without involving a radio access network, the method comprising the steps of:
 finding a candidate terminal capable of executing direct communication with the radio communication terminal;
 obtaining second phonebook data containing an identifier of the candidate terminal found by the finding step, based on first phonebook data containing an identifier of the other radio communication terminal and being associated with the radio communication terminal;
 receiving permission information on the direct communication via the radio access network; and
 executing direct communication, upon receipt of the permission information, with a counterpart terminal indicated in a communication request from the communication application, when the counterpart terminal is contained in the second phonebook data as the candidate terminal.

* * * * *